United States Patent

Stoller et al.

Patent Number: 5,949,856
Date of Patent: *Sep. 7, 1999

[54] DATA COLLECTION SYSTEM

[76] Inventors: Gary Stoller, One Hillside Ave.; Bert E. Broadsky, South Rd., both of Port Washington, N.Y. 11050

[*] Notice: This patent is subject to a terminal disclaimer.

[21] Appl. No.: 09/186,128

[22] Filed: Nov. 4, 1998

Related U.S. Application Data

[63] Continuation of application No. 08/824,530, Mar. 26, 1997, Pat. No. 5,835,575.

[51] Int. Cl.$^6$ ................................................. H04M 11/00
[52] U.S. Cl. ............................ 379/93.01; 379/38; 705/32; 348/14
[58] Field of Search .................. 379/93.01, 92.01–92.03, 379/93.02, 93.12, 93.18, 93.26–93.28, 90.01, 110.01, 38–40, 42, 49, 67.1, 88.1, 127; 705/32; 348/14–16

[56] References Cited

U.S. PATENT DOCUMENTS 5,835,575  11/1998  Stoller et al. ...................... 379/93.01

*Primary Examiner*—Wing F. Chan
*Attorney, Agent, or Firm*—Lockwood, Alex, Fitzgibbon & Cummings

[57] ABSTRACT

A computer-based system is provided for collecting data from callers, including a customer's database corresponding to a customer's Dialed Number Identification Service (DNIS) and in which system the caller has an identification code. When a call is received, the DNIS is detected and is compared with the customer's database to determine the data to collect during the call. If a caller identification code is required, then the caller identification code is obtained and the caller identification code is compared, via the computer, with a check digit algorithm without referencing a caller identification code database. After the call is terminated, a call record is created for the received call.

20 Claims, 2 Drawing Sheets

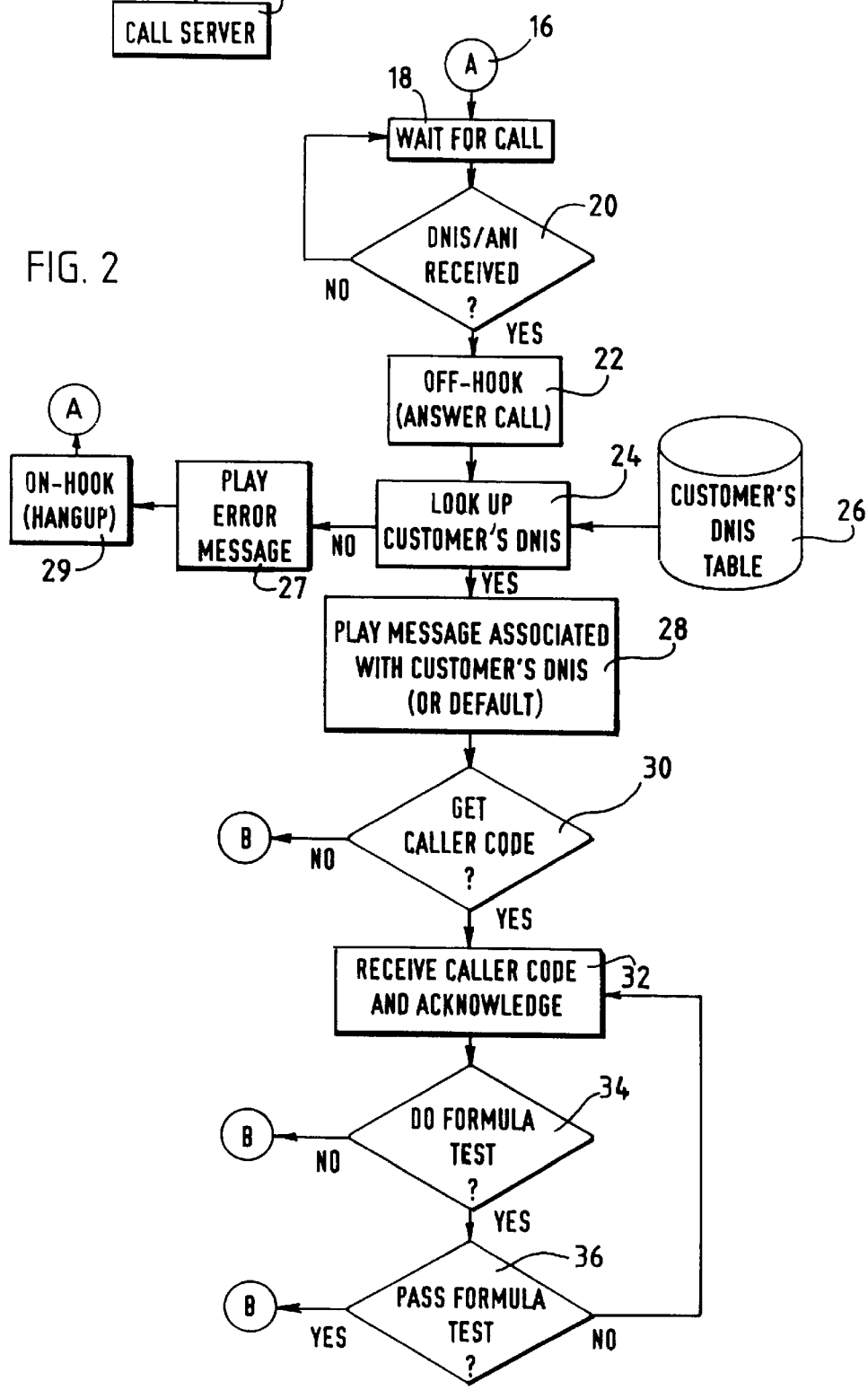

DATA COLLECTION SYSTEM

This application is a continuation of Ser. No 08/824,530, filed Mar. 26, 1997, now U.S. Pat. No. 5,835,575.

FIELD OF THE INVENTION

The present invention concerns a novel computer-based system for collecting data from callers, for example via a telephone network, and for generating reports concerning the data.

BACKGROUND OF THE INVENTION

Systems are known in the prior art for tracking persons such as employees by using computer-based telephone tracking and reporting apparatus. For this purpose, a computer-based tracking and reporting service may have a number of customers, each of which customers is a company with employees that provide services to a client. For example, the customer may be a nurses association, the employees of which are nurses who provide nursing services to a patient at the patient's home. In the parlance of the computer-based tracking service, the nurses association is the customer, the nurse is the "employee" or "caller", and the person receiving the service from the employee-caller is the "client."

Ordinarily the employee-caller is scheduled to provide services at the client's address at a specified date for a specified amount of time. The nurses association (i.e., the customer) may want to track the nurse's time of arrival, time of departure, etc. at the client's location in order to have a record of the nurse's activity and amount to be paid to the nurse for the nursing services and/or to the nurses association by a medical insurance company.

In one prior art computer-based data collection system, the employee calls a telephone number when the employee arrives at the client's location. When the call is received, the Dialed Number Identification Service (DNIS) is detected and the Automatic Number Identification (ANI) is also detected. The DNIS is compared with a customer database and the employee is requested to enter the appropriate data. The entered data, the DNIS, the ANI, and other information such as the time and date of the call is recorded and saved. However, on occasion the employee, caller, may enter the wrong caller identification, and the system will record an incorrect caller identification code and will be unable to determine the correct identification of the caller.

In Katz U.S. Pat. No. 5,255,183, a telephone-based personnel tracking system is disclosed in which, while the telephone call is being received, an employee identification code database is accessed to verify the employee identification code being received. Although this system alleviates a problem with respect to validating the employee identification code during the telephone call, it requires a database lookup in the caller identification code database during the telephone call. Such a database lookup delays the collection of data in that it may normally require a number of seconds to access the database and verify the employee identification code against the database table. Particularly at peak times, a database lookup could be inefficient and a cause of delay. Still further, if there are network resource problems, this database lookup may create serious delay problems.

I have discovered a novel system for validating a caller's identification code without requiring the overhead that is associated with a database lookup during the telephone call. Accordingly, it is an object of the present invention to provide a novel system for collecting data from callers, without requiring the reference of a caller identification code database during the telephone call.

Another object of the present invention is to provide a novel system for collecting data from callers which is relatively simple in construction and easy to operate.

A still further object of the present invention is to provide a novel system for collecting data from callers which, via a computer, compares a caller identification code with an algorithm without referencing a caller identification code database during the telephone call.

Other objects and advantages of the present invention will become apparent as the description proceeds. It is to be understood, however, that although the term "telephone" is used for convenience herein to refer to the medium upon which communication is achieved, the term "telephone" is intended to include cable transmission, satellite transmission, and any other type of transmission upon which communication can be achieved.

SUMMARY OF THE INVENTION

In accordance with the present invention, a system is provided for collecting data from callers, including a customer's database corresponding to a customer's Dialed Number Identification Service (DNIS) and in which system the caller has an identification code. The system includes the steps of connecting a computer system to a telephone network; when a call is received, the DNIS is detected and is compared with the customer's database to determine the data to collect during the calls. If the caller identification code is required, then the caller identification code is obtained. The caller identification code is compared, via the computer, with an algorithm without referencing a caller identification code database. Thereafter, a call record for the received call is created.

In the illustrative embodiment, the algorithm comprises a check digit algorithm and the caller identification code comprises a series of numbers. When the call is received, the Automatic Number Identification (ANI) is also detected and the ANI is included in the call record created for the received call.

In the illustrative embodiment, if the customer's database does not require the obtaining of the caller's identification code, then the steps of obtaining the caller's identification code and comparing the identification code with an algorithm are skipped. However, a call record is created and the ANI and the time and date of the call are saved.

In the illustrative embodiment, a determination is made from the customer's database what language to use for the recorded messages. Thereafter, the determined language is automatically selected and used in collecting the data.

In the illustrative embodiment, the step of creating a call record includes the steps of, after the call is terminated, accessing a caller identification code database, accessing a call database having date and time information, and accessing an ANI database, for obtaining from the databases, for the call record, the identification of the caller, the date and time of the call, and the location from where the call was made.

In the system of the illustrative embodiment, the customer is a company with employees that provide services to a client, the caller is one of the employees and the client is the person receiving service from the employee at the ANI location.

A more detailed explanation of the invention is provided in the following description and claims, and is illustrated in the accompanying drawings.

BRIEF DESCRIPTION OF THE DRAWINGS

FIG. 1 is a diagrammatic view of a computer-based system constructed in accordance with the principles of the present invention.

FIGS. 2 and 3, when combined, comprise a flow chart of a system constructed in accordance with the principles of the present invention.

DETAILED DESCRIPTION OF THE ILLUSTRATIVE EMBODIMENT

Referring to FIG. 1 which is an overview of the present invention, a telephone set 10 at a client's location is connected to the Public Switched Telephone Network (PSTN) 12, which is connected to a call server 14. Call server 14 is a computer system for receiving the telephone calls from the PSTN 12 and for processing the received calls. Call server 14 processes telephone calls for a number of customers, each of which has at least one Dialed Number Identification Service (DNIS).

When the caller takes telephone 10 off-hook, the call is made into the Public Switched Telephone Network 12 and is switched by Public Switched Telephone Network 12, to call server 14. Call server 14 is programmed to detect the Dialed Number Identification Service (DNIS) of the customer when the call is received, and to detect the Automatic Number Identification (ANI) which is the phone number of telephone 10.

Figure 3:
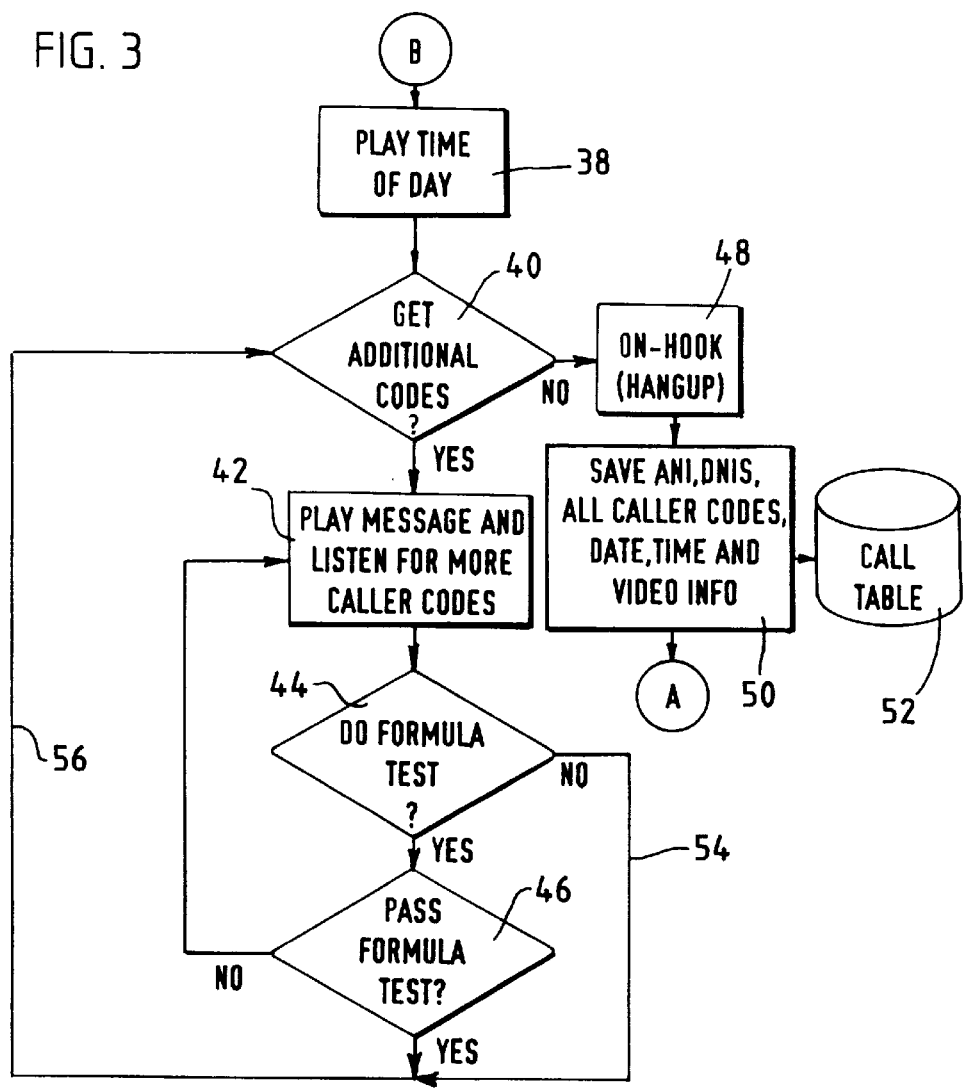

The operation of call server 14 is illustrated in flow chart form in FIGS. 2 and 3. Referring to FIG. 2, the system starts 16 and waits for a call to be received 18. A determination is made whether a call with the DNIS and ANI has been received 20. If not, the system continues to await the call 18. When a call has been received carrying the DNIS and ANI, the call is answered 22 and the customer's DNIS is looked up 24 from the customer's DNIS databank 26. If the DNIS received is not a valid DNIS of a customer, the system will play an error message 27 and the line will be placed on-hook (hangup) 29. The system will then return to waiting for a call 18.

Call server 14 has numerous trunk lines dedicated to a number of customers, and different customers have different requirements with respect to the data that is expected to be received. For example, one customer may have employees that speak Spanish, with each employee having a numerical employee identification code that must be entered into the system via the telephone keypad for the employee to be identified. In this instance, when the system looks up the customer's DNIS, it will recognize that customer and a message may be played to the caller in Spanish and the system will expect the caller to enter his/her numerical identification code via the telephone keypad. On the other hand, another customer may require that the message be in English and also use a numerical employee identification code. Alternatively, another customer may also require English, but may require a voice print by the caller as the identification code of the caller, instead of a series of numbers. Still further, another customer may require an English message and also require that the caller's identification code be spoken in English, rather than entered on the telephone key pad. Still further, another customer may not require the entry of the caller's identification code but may only require that a call be made from a predetermined ANI.

It can thus be seen that there are numerous combinations of languages and caller identification codes that can be used in the collection of data. By looking up the customer's DNIS from the customer's DNIS databank 26, the system will know the customer's data requirements.

Once the customer's requirements have been detected from the customer's database 26, the system will play a message associated with the customer's DNIS 28. For example, the message may be in English, advising the caller to enter his/her six digit customer identification code on the telephone key pad. The system then checks to determine if the caller's identification code has been received 30. If it has been received, the system plays a message such as a "thank you" message to advise the customer that the code has been received 32. If the caller code is not received 30, the system then goes to subroutine B which is illustrated by a flowchart in FIG. 3.

When a caller code is received 32, it is validated in accordance with the present invention without using a caller identification code databank lookup. To this end, the system determines whether a formula test should be performed. If so, the system provides a formula test 36 by comparing the caller identification code with a computer-based algorithm, without referencing a caller identification code database. In accordance with the illustrative embodiment of the present invention, a check digit algorithm is utilized. The formula test confirms that the caller code passes a check digit algorithm. No caller identification code table or caller identification code database is referenced and the formula test does not guarantee that the caller code will be a valid identification in a database. However, it reduces caller code entry errors since only certain combinations of digits will pass the formula test without the overhead of a database search.

The following is a specific example of a check digit algorithm formula test that could be used. It is to be understood, however, that this is merely a specific example and that other formula tests and algorithms may be used as desired.

Formula Test Process:
1. The last digit is the check digit.
2. Sum the digits by adding each single digit in the number excluding the check digit.
3. Add the even place digits, counting from left to right with the leftmost digit being number 1 or a odd digit. Add this sum to the above sum in step 2.
4. Subtract the last digit of the above sum from 10.
5. If the above number is 10 then use zero otherwise the number will be the check digit.
6. The check digit computer above must match the check digit of the number to pass the formula test.

Formula Test Example:
Number 123459
The last digit '9' is the check digit.
Step 2: 1+2+3+4+5=15
Step 3: 2+4+15=21
Step 4: 10−1=9 (the '1' comes from the last digit of '21' above)
Step 5+6: '9' is the check digit and matches the '9' in the number 123459.

If the caller's identification code passes the formula test 36, the system then goes to subroutine B illustrated in FIG. 3. If the caller identification code entered by the caller does not pass the formula test 36, the system plays a message and listens again for the caller code 32.

Subroutine B is illustrated in FIG. 3. Referring to FIG. 3, the time of day is played 38 and, if appropriate, additional codes are requested 40. If additional codes are to be obtained, a message requesting the additional codes is played and the system listens for additional caller codes 42. The system then checks to determine whether a formula test is required 44 and if so, a determination is made whether the caller code has passed the formula test 46. Again, the formula test comprises an algorithm which does not require reference to a caller identification code table or a caller identification code database.

In the illustrative embodiment, the formula test is a check digit algorithm as described above. If the check digit algorithm validates the caller code thereby passing the formula test, a determination is made whether additional codes should be obtained 40. Likewise, if there is no requirement for the formula test 44, a determination is made, for example by referencing the customer's database, whether additional codes should be obtained 40. If additional codes need not be obtained, the system places the telephone on-hook (hang up) and the ANI, DNIS, caller codes, date, time and video information are saved 50 and are forwarded to a call table databank 52.

If the caller code does not pass the formula test, a message is played and the system listens for more caller codes 42. The system is programmed so that the formula test determination 44 will only run a predetermined number of times, for example three times, and thereafter the formula test will not be performed. Instead, the system will return via lines 54 and 56 back to determining whether additional codes should be obtained 40.

Figure 4:
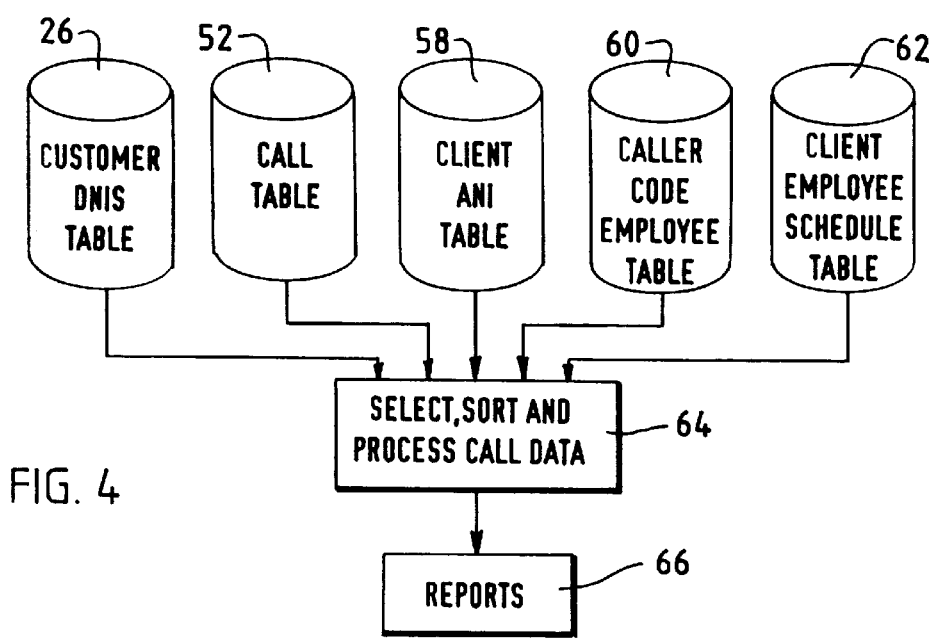
FIG. 4 is a diagrammatic view of the databases and report generating system of a system constructed in accordance with the principles of the present invention.

Referring to FIG. 4, the various tables or databases are illustrated diagrammatically for showing the processing of the call data. It can be seen that customer DNIS table 26, call table 52, client ANI table 58, caller code employee table 60 and client employee schedule table 62 feed information to select, sort and process call data 64, which outputs appropriate reports 66. After the call is terminated, the DNIS, ANI, caller code, date and time will be selected, sorted and compared against the corresponding databanks and the computer will be able to compile the data in a form showing, for a particular customer, when the employee (caller) made the call from the client's location.

By using a formula test without requiring a database lookup to confirm the caller code, the system has the ability to reduce caller code entry errors. For example, in a prior art system that does not use any validation of the caller code, if an incorrect code is entered the system will merely accept it. After the call, during the sorting and processing, the system would be unable to determine which employee has called. On the other hand, by using the present invention, when an incorrect identification code is entered, it is likely that the formula test will detect an incorrect code and a message can be presented to the caller requesting that the caller reenter his/her identification code. If it passes the formula test, it is likely a valid code. It can be seen that by using a computer-operated algorithm, without referencing a caller identification code database, the overhead and delays associated with a database lookup are obviated.

The system of the present invention can be operated in a manner that will assure the customer that the caller is the correct person who is supposed to be calling. For example, the customer may be a parole office, the caller may be a parolee who is required to be at a particular location (such as his/her home) and the ANI may be the telephone number of the telephone at the location where the parolee is required to be. In order to prevent someone other than the parolee calling from the proper ANI and fraudulently entering the parolee's identification number, a video telephone is utilized. To this end, the parolee places the telephone call from a video telephone and call server 14 receives the call, utilizes the steps set forth in FIGS. 2–4, but also records the video signal so that the parole office can review the video after the call is terminated. For example, the video signal is digitized and stored in the computer. When the data is processed, a report includes the parolee's name and identification, the ANI, the date, the time, and access to a stored file which includes the video showing the parolee's face or any other means of identification of the specific parolee. The use of a stored video picture of the caller provides security that the actual person who was expected to have made the call was present to make the call, and fraudulent calls are alleviated.

The video telephone could include a dedicated conventional video telephone such as the video telephone sold by AT&T, or the video telephone sold by Sony, or it could be a video conferencing system from a personal computer, or any other type of video communication medium.

Although an illustrative embodiment of the invention has been shown and described, it is to be understood that various modifications and substitutions may be made by those skilled in the art without departing from the novel spirit and scope of the present invention.

What is claimed is:

1. A system for collecting data from callers, including a customer's database corresponding to a customer's Dialed Number Identification System (DNIS) and in which system the caller has an identification code, including the steps of:

connecting a computer system to a communication transmission network;

when a call is received, detecting the DNIS;

comparing the DNIS with said customer's database to determine the data to collect during the call;

if the caller identification code is required, then obtaining the caller identification code;

comparing the caller identification code, via said computer, with an algorithm which comprises a check digit algorithm; and creating a call record for the received call.

2. A system as defined by claim 1, in which said caller identification code comprises a series of numbers.

3. A system as defined by claim 1, in which when the call is received, also detecting the Automatic Number Identification (ANI) and including the ANI in said call record created for the received call.

4. A system as defined by claim 3, wherein if the customer's database does not require the obtaining of the caller's identification code, then skipping the steps of obtaining the caller's identification code and comparing the identification code with an algorithm, but creating a call record and saving the ANI and the time and date of the call.

5. A system as defined in claim 1, including the steps of determining from the customer's database what language to use for recorded messages and thereafter automatically selecting and using the determined language in collecting the data.

6. A system as defined by claim 1, in which the step of creating a call record includes the steps of: after the call is terminated, accessing a caller identification code database, accessing a call database having date and time information, and accessing an ANI database, for obtaining from said databases, for the call record, the identification of the caller, the date and time of the call, and the location from where the call was made.

7. A system as defined by claim 1, in which said customer is a company with employees that provide services to a client, said caller is one of said employees and said client is the person receiving service from said employee at the ANI location.

8. A system as defined by claim 1, in which the call is made from a telephone including a video source, and the call record includes the storage of video information relating to the caller.

9. A system as defined by claim 1, in which the call is made from a communication transmission network including voice print recognition capabilities, and the call record includes the storage of voice information relating to the caller.

10. A system for collecting data from callers, including a customer's database corresponding to a customer's Dialed Number Identification Service (DNIS) and in which system the caller has an identification code, including the steps of:

connecting a computer system to a communication transmission network;

when a call is received, detecting the DNIS and the ANI;

comparing the DNIS with said customer's database to determine the data to collect during the call;

if a caller identification code is required, then obtaining the caller identification code from the caller;

comparing the caller identification code, via the computer, with an algorithm, said algorithm comprising a check digit algorithm and said caller identification code comprising a series of numbers;

creating a call record for the received call, the step of creating said call record including the steps of: after the call is terminated, accessing a caller identification code database, accessing a call database having date and time information, and accessing an ANI database, for obtaining from said databases, for said call record, the identification of the caller, the date and time of the call, and the location from where the call was made; and said customer being a company with employees that provide services to a client, said caller being one of said employees and said client being the person receiving services from said employee at the ANI location.

11. A system as defined by claim 10, including the step of determining from the customer's database what language to use for recorded messages and thereafter automatically selecting and using the determined language in collecting the data.

12. A system as defined by claim 10, wherein if the customer's database does not require the obtaining of the caller's identification code, then skipping the steps of obtaining the caller's identification code and comparing the identification code with an algorithm.

13. A system as defined by claim 10, in which the call is made from a telephone including a video source, and the call record includes the storage of video information relating to the caller.

14. A system as defined by claim 10, in which the call is made from a communication transmission network including voice print recognition capabilities, and the call record includes the storage of voice information relating to the caller.

15. A system for collecting data from callers, including a customer's database corresponding to a customer's Dialed Number Identification Services (DNIS) and in which the system the caller has an identification code, which system comprises:

a computer system connected to a telephone network;

data channel circuitry which detects the DNIS when a call is received;

data channel circuitry which compares the DNIS with said customer's database to determine the data to collect during the call;

data channel circuitry which obtains the caller identification code if the caller identification code is required;

computer circuitry which compares the caller identification code with an algorithm which includes a check digit algorithm; and data channel circuitry which creates a call record of the received call.

16. A system as defined by claim 15, in which said caller identification code comprises a series of numbers.

17. A system as defined by claim 15, including a call database having date and time information, an ANI database, and a caller identification code database; data channel circuitry which accesses said database and obtains from said databases, for said call record, the identification of the caller, the date and time of the call, and the location from where the call was made.

18. A system for collecting data from callers, including a customer's database corresponding to a customer's Dialed Number Identification Service (DNIS), and in which system the caller has an identification code, including the steps of:

requiring the caller to call from a communication transmission network which includes a video source;

connecting a computer system to the communication transmission network;

when a call is received from the network having the video source, detecting the DNIS and Automatic Number Identification (ANI);

comparing the DNIS with said customer's database to determine the data to collect during the call;

if the caller identification code is required, then obtaining the caller identification code;

comparing the caller identification code, via said computer, with algorithm which includes a check digit algorithm;

storing video information transmitted from said network having the video source; and creating a call record for the received call, said call record including the identification of the caller, the ANI, and video information.

19. A system as defined by claim 18, in which the step of creating a call record includes: after the call is terminated, accessing a call database system having date and time information and the location from where the call was made.

20. A system as defined by claim 18, in which said caller identification code comprises a series of numbers.

* * * * *

UNITED STATES PATENT AND TRADEMARK OFFICE
CERTIFICATE OF CORRECTION

PATENT NO. : 5,949,856
DATED : September 7, 1999
INVENTOR(S) : Gary Stoller and Bert E. Brodsky It is certified that error appears in the above-identified patent and that said Letters Patent is hereby corrected as shown below:

On the Cover Page, under the Inventors, delete "Broadsky" and
    insert --Brodsky--.
Col. 1, lines 19, 22, 28 and 32, delete "nurses association"
    and insert --nurses' association--.

Signed and Sealed this

Tenth Day of April, 2001

Attest:

NICHOLAS P. GODICI

Attesting Officer     Acting Director of the United States Patent and Trademark Office